(12) United States Patent
Noguchi et al.

(10) Patent No.: US 7,321,585 B2
(45) Date of Patent: Jan. 22, 2008

(54) DATA COMMUNICATION APPARATUS AND DATA COMMUNICATION METHOD

(75) Inventors: Yoshihiro Noguchi, Kanagawa (JP); Motoyasu Ohno, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 833 days.

(21) Appl. No.: 10/695,943

(22) Filed: Oct. 30, 2003

(65) Prior Publication Data

US 2005/0041643 A1    Feb. 24, 2005

(30) Foreign Application Priority Data

Aug. 5, 2003    (JP) ............... 2003-286358

(51) Int. Cl.
H04L 12/66 (2006.01)
H04J 1/02 (2006.01)
H04J 3/06 (2006.01)

(52) U.S. Cl. .................. 370/352; 370/493; 370/509

(58) Field of Classification Search ............. 370/352, 370/466, 467, 493, 494, 495, 503, 507–510, 370/252; 375/222, 230, 231, 293, 354, 356, 375/358, 359
See application file for complete search history.

(56) References Cited

U.S. PATENT DOCUMENTS

| | | | |
|---|---|---|---|
| 5,491,720 A * | 2/1996 | Davis et al. | 375/222 |
| 6,195,359 B1 * | 2/2001 | Eng et al. | 370/401 |
| 6,542,472 B1 | 4/2003 | Onuma | |
| 6,792,040 B1 * | 9/2004 | Davis et al. | 375/222 |
| 6,978,000 B2 * | 12/2005 | Niiya | 379/156 |
| 7,072,332 B2 * | 7/2006 | D'Souza | 370/352 |
| 2002/0191639 A1 * | 12/2002 | Norby | 370/466 |
| 2002/0194282 A1 | 12/2002 | Saito et al. | |

FOREIGN PATENT DOCUMENTS

JP    2002-368815    12/2002

OTHER PUBLICATIONS

English Language Abstract of JP 2002-368815. Dec 20, 2002.

* cited by examiner

Primary Examiner—Quoc Tran
(74) Attorney, Agent, or Firm—Greenblum & Bernstein, P.L.C.

(57) ABSTRACT

A data communication apparatus is provided with a VoIP processor and a modem that interchangeably executes a standard communication mode and a high-speed communication mode, the standard communication mode exchanging the voice packet at a predetermined transfer rate, the high-speed communication mode exchanging the voice packet at a rate faster than the rate of the standard communication mode. When capability information of an opposing apparatus is obtained, in accordance with a predetermined communication protocol, and it is detected that the opposing apparatus has the high-speed communication mode, the high-speed communication mode is selected for execution.

12 Claims, 7 Drawing Sheets

DATA COMMUNICATION APPARATUS AND DATA COMMUNICATION METHOD

BACKGROUND OF THE INVENTION

1. Field of the Invention

The present invention relates to a data communication apparatus and a data communication method that communicate by storing non-voice data in a voice packet, in a voice communication system that dialogues by exchanging voice packets via an IP network.

2. Description of Related Art

In recent years, so-called VoIP (Voice over Internet Protocol) communication system has rapidly become available. The VoIP dialogues by exchanging voice packets via an IP network. In addition, an IP telephone adaptor apparatus has been introduced, the apparatus enabling the continued use of an ordinary PSTN telephone in the VoIP communication system.

In addition, a data communication apparatus has become known, realizing transmission of high resolution image data for Internet facsimile apparatuses, by exchanging capability information in accordance with a mail protocol, the Internet facsimile apparatuses performing data transmission by storing image data in e-mail (see Related Art 1).

[Related Art 1]

Japanese Patent Laid Open Publication 2002-368815

Therefore, by utilizing an IP telephone adaptor apparatus similarly to a telephone, it becomes possible, in principle, to use the conventional data communication apparatus for the PSTN (e.g., facsimile apparatus) in the VoIP communication system. However, since the VoIP communication system is optimized for voice communication, various problems occur when used for facsimile communication (data communication). For example, the VoIP communication system does not retransmit data to ensure the real-time voice reproduction. Therefore, when there is an overflow within a jitter buffer, the data is destroyed. When there is an underflow, the data is interpolated based on the data immediately before. Such data destruction and interpolation would lower the communication quality for data communication, interfering an accurate data reproduction.

In order to perform data communication utilizing the VoIP communication system, the configuration of the IP telephone adaptor apparatus needs to be changed in order to be suited to data communication (to accurately reproduce data). When both caller apparatus and receiver apparatus have a function specialized for data communication, it is possible to achieve high-speed data communication with an independently set specification, without being limited to a common standard method for the VoIP communication system. This improvement would greatly enhance the convenience of the data communication apparatus.

SUMMARY OF THE INVENTION

The present invention is provided based on the above-described notion of the inventors. The main purpose of the present invention is to provide a data communication apparatus and a data communication method that are configured to perform high-speed data communication without being limited to the common standard method for the voice communication system.

As a solution to the above-described problems, the present invention provides, as illustrated in claim 1, a data communication apparatus that communicates by storing non-voice data in a voice packet, in a voice communication system that dialogues by exchanging voice packets via an IP network. The data communication apparatus includes a data processor that operates with two switchable modes, a standard communication mode, exchanging voice packets at a predetermined transfer rate, and a high-speed communication mode, exchanging voice packets at a faster rate than the one of the standard communication mode. The data communication apparatus also includes a controller that enables a data process execution, upon obtaining the capability information of an opposing apparatus according to a predetermined communication protocol, by selecting the high-speed communication mode, when the opposing apparatus has the high-speed communication mode.

Accordingly, when the opposing apparatus has the high-speed communication mode, i.e., when both caller apparatus and receiver apparatus are the data communication apparatuses of the present invention, the high-speed data communication becomes available, by selecting and executing the high-speed communication mode that exchanges packets in a high speed at an independently set transfer rate. When the opposing apparatus does not have the high-speed communication mode, i.e., when a conventional data communication apparatus is connected to the IP network via an IP telephone adaptor apparatus, the standard communication mode is selected and executed.

It is preferable to employ a lossless voice encoding method, such as the ITU-T recommended G.711. In addition, the present invention can be configured to have several types of high-speed communication modes.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
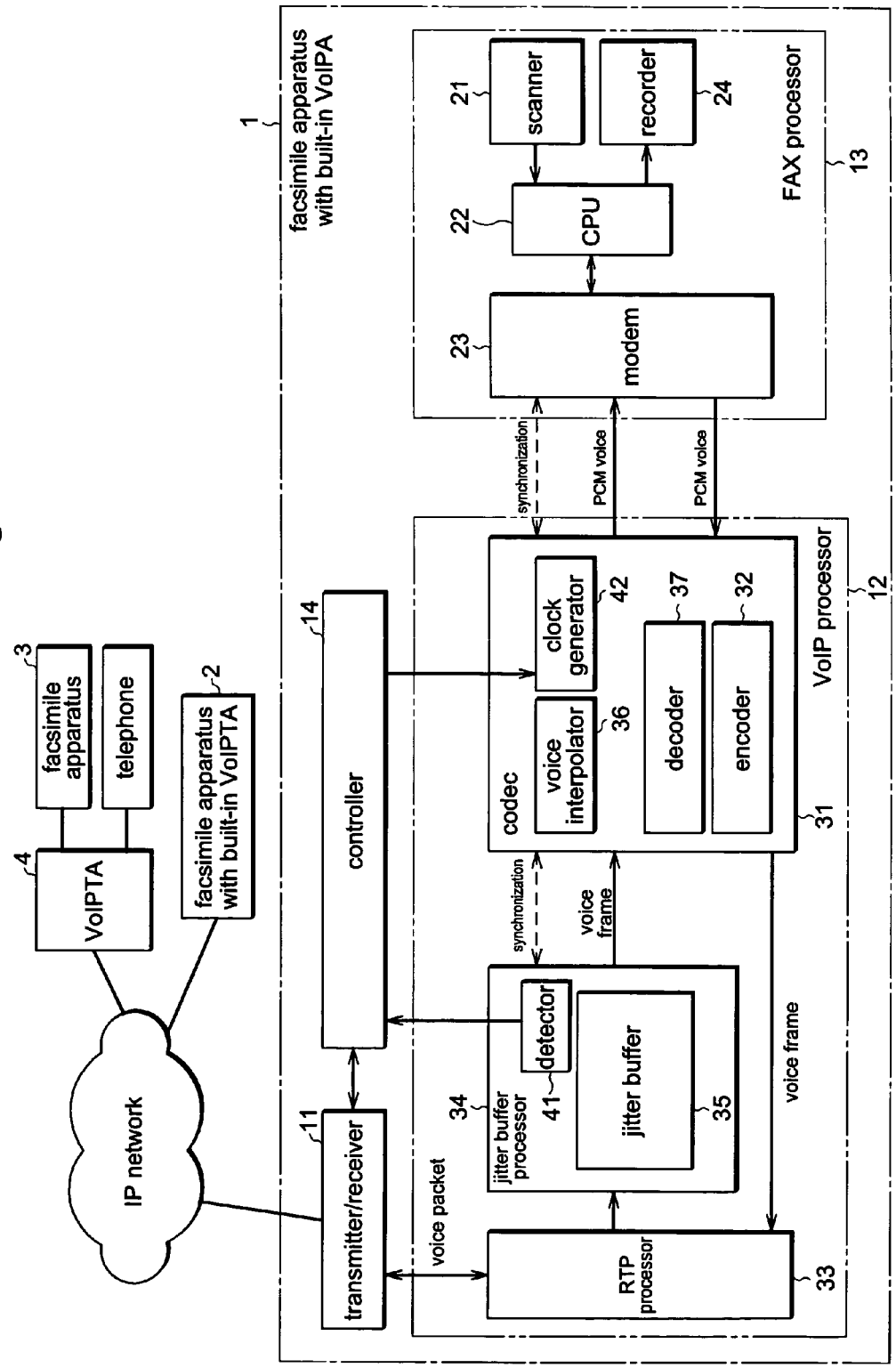
FIG. 1 is a block diagram illustrating a facsimile apparatus with a built-in IP telephone adaptor according to an embodiment of a data communication apparatus of the present invention.

FIG. 1 is a block diagram illustrating a facsimile apparatus with a built-in IP telephone adaptor according to an embodiment of a data communication apparatus of the present invention. In the VoIP communication system that dialogues by exchanging voice packets via the IP network, facsimile apparatus 1 stores facsimile data in a voice packet and performs a deemed voice communication with facsimile apparatus 2 having the same configuration as facsimile apparatus 1, or with IP telephone adaptor apparatus (VoIPA) 4, to which a conventional facsimile apparatus 3 is connected. Facsimile apparatus 1 includes transmitter/receiver 11, VoIP processor 12, facsimile processor 13, and controller 14.

Upon transmitting data from facsimile apparatus 1, image data, generated when scanner 21 (of facsimile processor 13) scans the transmitting document, is input into modem 23 via CPU 22. Modem 23 converts the facsimile data into PCM voice data according to the G3 facsimile communication protocol. The PCM voice data is first encoded by encoder 32 of codec 31 (of VoIP processor 12), according to the regulated voice encoding method of the ITU-T recommended G. 711. Then, the data is built into a voice packet according to the RTP (Real-time Transport Protocol) by RTP processor 33, and transmitted to the IP network via transmitter/receiver 11.

Transmitter/receiver 11 receives, from the IP network, the voice packet in which the facsimile data is stored. Then, RTP processor 33 (of VoIP processor 12) disassembles the packet according to the RTP, and analyses the data to confirm the exchange of the packet. A voice frame output from RTP processor 33 is temporarily stored in jitter buffer 35 of jitter buffer processor 34 and sequentially output to codec 31. Codec 31 performs voice frame interpolation at voice interpolator 36 and decoding process at decoder 37, and outputs the PCM voice data. The PCM voice data is then transmitted to facsimile processor 13 and demodulated at modem 23. Then, the obtained image data is recorded on a recording media (such as paper) by recorder 24.

Codec 31 operates with a standard clock generated by internal clock generator 42, so that the output process of the voice frame at jitter buffer 35 is synchronized with the standard clock of clock generator 42. Also, codec 31 and modem 23 are digitally connected to each other so that modem 23 can synchronize with the standard clock of clock generator 42 within codec 31 and perform the coding/decoding process. The clock generator 42 can adjust the timing of clock signal generation, in accordance with the control signal of controller 14, thereby adjusting the operation timing of the output process of jitter buffer 35 and the data process of codec 31 and modem 23.

Figure 2A:
FIGS. 2A and 2B are timing charts illustrating a data process at the facsimile apparatus of FIG. 1.
Figure 2B:
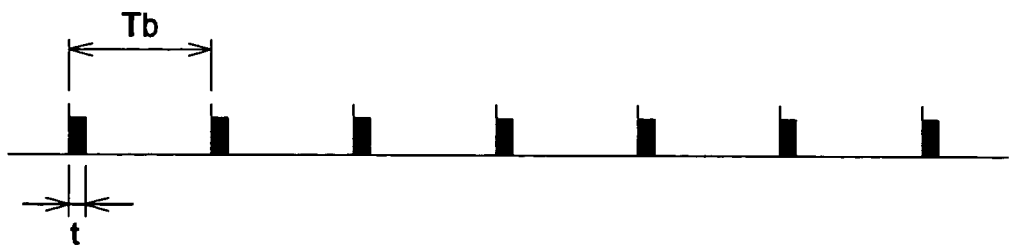

FIG. 2 is a timing chart illustrating the data process of the facsimile apparatus shown in FIG. 1. The facsimile apparatus has a standard communication mode that exchanges voice packets at a predetermined transfer rate, which is standard in the VoIP communication system, and a high-speed communication mode that exchanges voice packets at a higher speed than that of the standard communication mode. The modes can be switched when a switch instruction is given by controller 14, to change the generation timing of clock generator 42. Accordingly, the process rate of VoIP processor 12 and modem 23 is changed.

In this example, the processes at VoIP processor 12 and modem 23 are performed at process time "t" in accordance with the pulse generated by clock generator 42. In the standard communication mode shown in FIG. 2(A), the voice frame is processed between the time intervals (e.g., 10 msec), which is standard for the VoIP communication system. Whereas in the high-speed communication mode shown in FIG. 2(B), the voice frames are processed with an independently set time intervals (e.g., 5 msec), at a higher speed than that of the standard communication mode.

In the high-speed communication mode, in addition to the transfer rate change, the packet transmission and reception operations are synchronized at the caller and receiver apparatuses. This is performed by exchanging synchronization signals (synchronization information) with the opposing apparatus, similarly to a synchronous modem. In the standard communication mode, in contrast, the data is exchanged in accordance with a standard clock installed in each apparatus, similarly to a standard asynchronous modem. In addition, in the standard communication mode, codec 31 operates at a sampling rate (8 kHz) regulated by the ITU-T recommended G.711, which is standard for the VoIP communication system. However, in the high-speed communication mode, there is no such limitation and the sampling rate can be independently set (e.g., 16 kHz).

Figure 3:
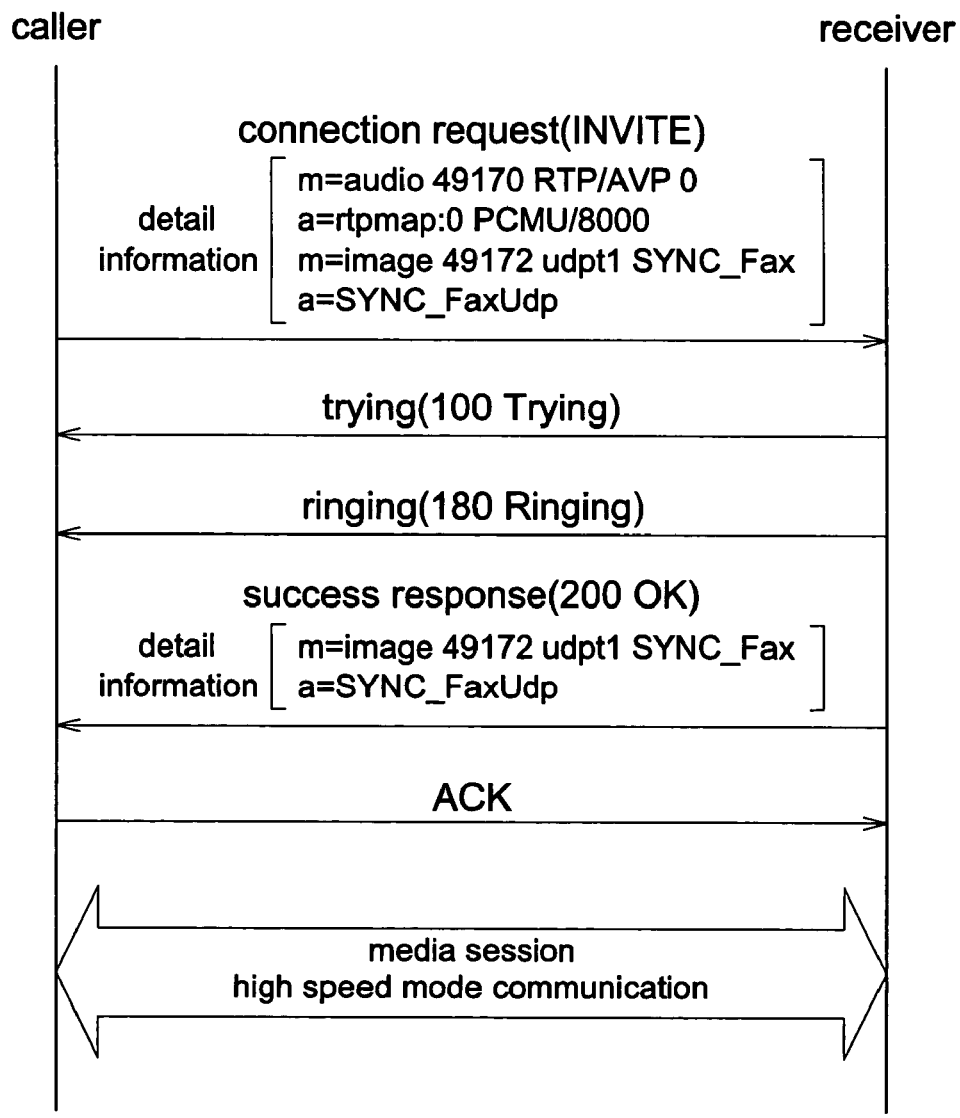
FIG. 3 is a sequence chart illustrating how capability information is exchanged between facsimile apparatuses according to the present invention (shown in FIG. 1)

FIG. 3 is a sequence chart illustrating how the capability information is exchanged between facsimile apparatuses of the present invention (shown in FIG. 1). The facsimile apparatuses establish a media session in accordance with the SIP (Session Initiation Protocol), which is standardized by the IETF. In this media session, voice packets, in which facsimile data is stored, are exchanged. During the establishment of the media session, in addition to a signaling message regulated by the SIP, capability information is exchanged with the opposing apparatus. Upon checking the capability information obtained from the opposing apparatus, and when the opposing apparatus has the high-speed communication mode, the high-speed communication mode can be selected and executed. In addition, the process related to the SIP is performed by controller 14.

In this example, when the caller apparatus makes a connection request to the receiver apparatus according to the SIP protocol, the caller apparatus transmits, to the receiver apparatus, capability information relating to both standard and high-speed communication modes. In particular, the capability information of its own apparatus (caller apparatus) is added to the transmitting message (INVITE) requesting for connection (request for session establishment). To be specific, information including voice information relating to a type of encoding method (codec) usable for the caller apparatus in the standard communication mode (in this example, information relating to encoding performed by μ-1 awPCM at sampling rate of 8 kHz) and information that the caller apparatus has a high-speed communication mode (SYNC_FAX: synchronization facsimile) are added to the message requesting for connection (connection request message). Therefore, the receiver apparatus is notified that the caller apparatus has the high-speed communication mode.

When the receiver apparatus receives the connection request from the caller apparatus in accordance with the SIP protocol, and finds that the opposing apparatus (caller apparatus) has the high-speed communication mode included in the capability information (added to the connection request message), the receiver apparatus selects the high-speed communication mode and transmits the capability information relating to the high-speed communication mode, upon responding to the opposing apparatus with the SIP protocol. In particular, the capability information relating to the high-speed communication mode (SYNC_FAX) is added to a transmitting response message (200 OK). Accordingly, the caller apparatus is notified that the receiver apparatus has the high-speed communication mode. In the established media session thereafter, voice packets are exchanged in the high-speed communication mode.

Figure 4:
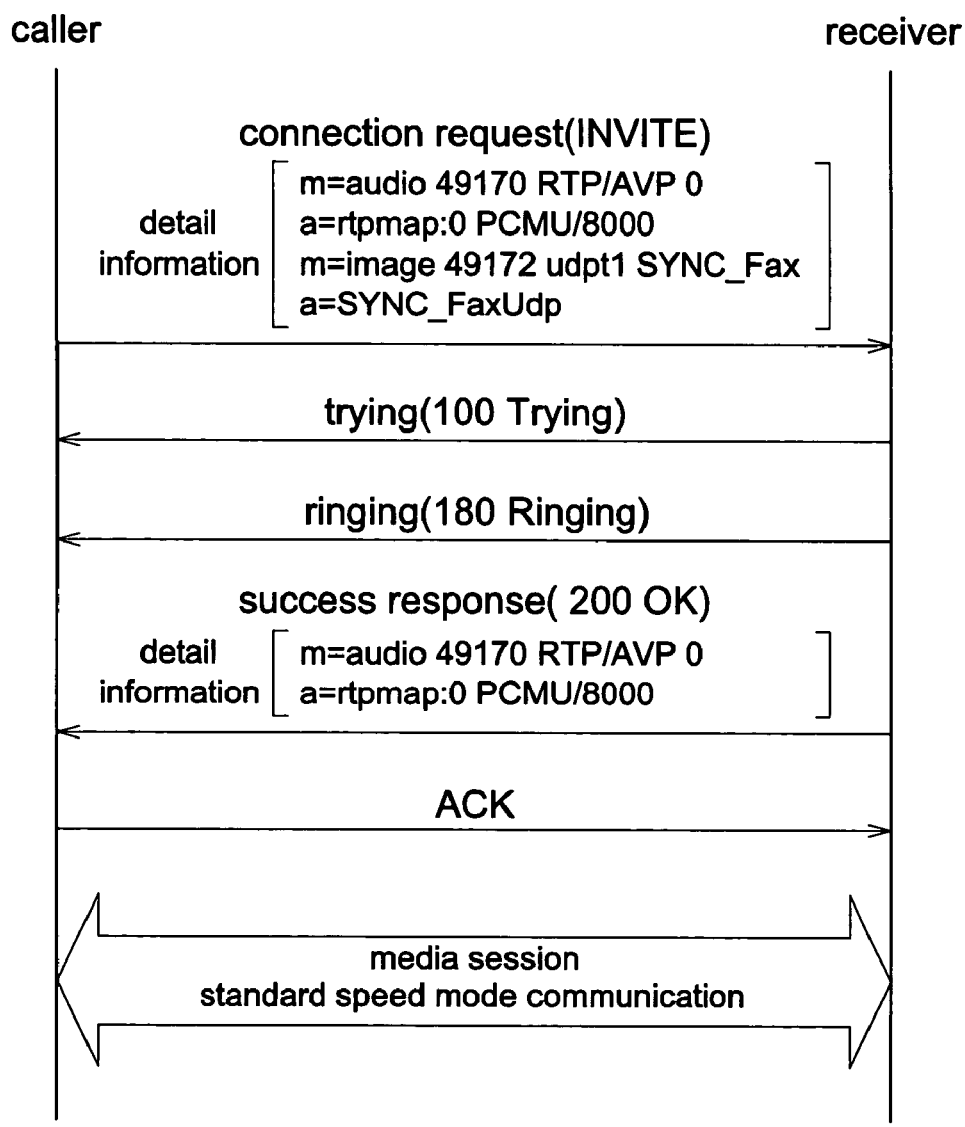
FIG. 4 is a sequence chart illustrating how capability information is exchanged between a facsimile apparatus of the present invention (shown in FIG. 1) and a conventional apparatus.

FIG. 4 is a sequence chart illustrating how the capability information is exchanged between the facsimile apparatus of the present invention (shown in FIG. 1) and a conventional facsimile apparatus. In this example, the caller apparatus is facsimile 1 of the present invention. The receiver apparatus is IP telephone adaptor apparatus 4 that is connected, in the analog method, to conventional G3 facsimile apparatus 3. In this example, the caller apparatus adds capability information of its terminal (caller apparatus) to the transmitting connection request message (INVITE), similar to the above example. Then, the receiver apparatus (not having the high-speed communication mode) ignores the information relating to the high-speed communication mode, but acknowledges the standard communication mode having the encoding method supported by its own terminal (receiver apparatus). Therefore, the receiver apparatus transmits a response message (200 OK) by adding the capability information of the standard communication mode. Accordingly, the caller apparatus is notified that the receiver apparatus does not have the high-speed communication mode. In the following established media session, voice packets are exchanged in the standard communication mode.

In the asynchronous data communication, because of the difference between the clock frequencies of both caller and receiver apparatuses (due to the individual difference of each clock generator), the deviation is caused between the process timings of the caller and receiver apparatuses. For example, when the process timing of the caller side is faster than the one of the receiver side, the jitter buffer at the receiver side will gradually accumulate data, causing an overflow at the end. Conversely, when the process timing of the caller side is slower than the one of the receiver side, the jitter buffer at the receiver side will gradually lose data, causing an underflow at the end. These overflow and underflow problems, caused by the deviation of the mutual process timings, cannot be solved by the limited capacity of the buffer. In other words, since the fluctuation of intervals between packet arrivals (due to the delay in the IP network) is non-cumulative, the fluctuation can be absorbed by a certain capacity of the buffer. However, when the changes in the data amount stored in the buffer are cumulative, the jitter buffer cannot absorb the changes by itself.

Controller 14 in the present facsimile apparatus adjusts the operation timing in accordance with the size of data amount stored in jitter buffer 35. In particular, jitter buffer processor 34 includes detector 41 that detects a buffer full state and a buffer empty state. In the buffer full state, the data amount stored in jitter buffer 35 exceeds a predetermined upper limit. In the buffer empty state, the data mount stored in jitter buffer 35 falls short of a predetermined lower limit. When the buffer full state is detected by detector 41, the operation timing of the output process of jitter buffer 35 and data process of codec 31 and modem 23 are accelerated. When the buffer empty state is detected by detector 41, the operation timing of the output process of jitter buffer 35 and data process of codec 31 and modem 23 are decelerated.

Figure 5A:
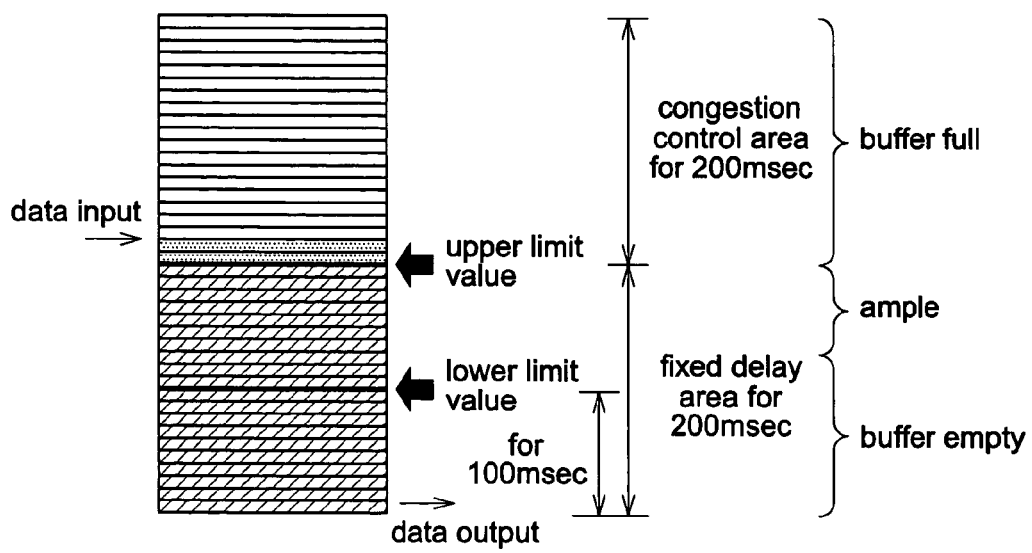
FIGS. 5A and 5B are schematic diagrams illustrating the jitter buffer of FIG. 1.
Figure 5B:
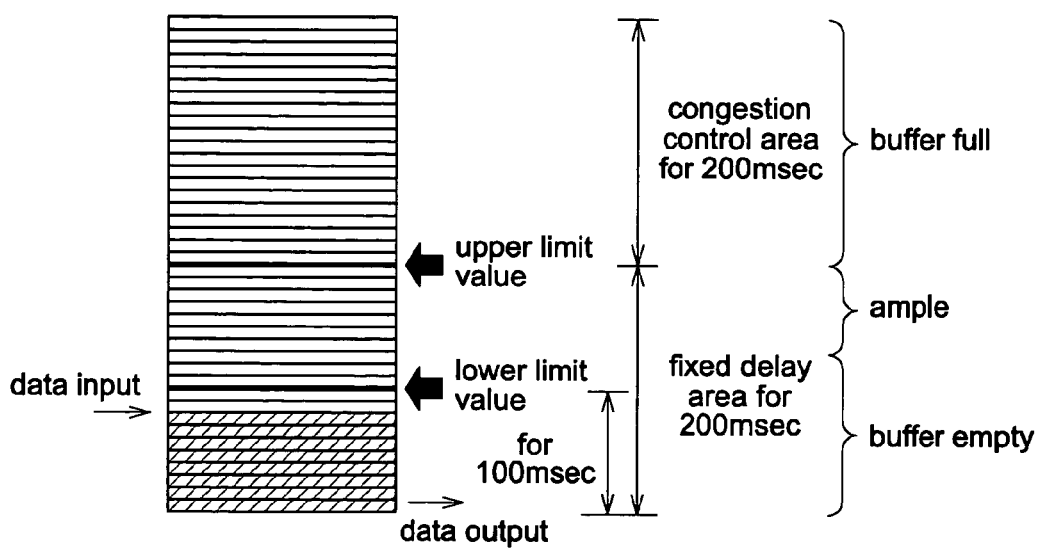

FIG. 5 is a schematic diagram of the jitter buffer of FIG. 1. FIG. 5(A) illustrates the buffer full state, while FIG. 5(B) illustrates the buffer empty state. As jitter buffer 35 sequentially outputs the stored voice frames from the very bottom of the buffer, each voice frame moves downward. A newly input voice frame is stored on the very top of the stored data. Jitter buffer 35 has a fixed delay area for a predetermined capacity (e.g., 200 msec) that absorbs the fluctuation of intervals between packet arrivals at the IP network, and the delay in the packet exchanges at RTP processor 33. When the data reaches the upper limit of the fixed delay area, the data exchange with codec 31 starts.

In addition, jitter buffer processor 34 sets the upper limit value (first threshold value), which is used by detector 41 to detect the buffer full state, at the upper limit of the fixed delay area. Jitter buffer 35 includes a congestion control area, above the fixed delay area, for a predetermined capacity (e.g., 200 msec) that handles a situation in which a cluster of packets stagnant at a router (due to a congested network) arrive in a very short period. Jitter buffer processor 34 sets the lower limit value (second threshold value), which is used by detector 41 to detect the buffer empty state, at a predetermined value (e.g., 100 msec) of the fixed delay area.

Figure 6A:
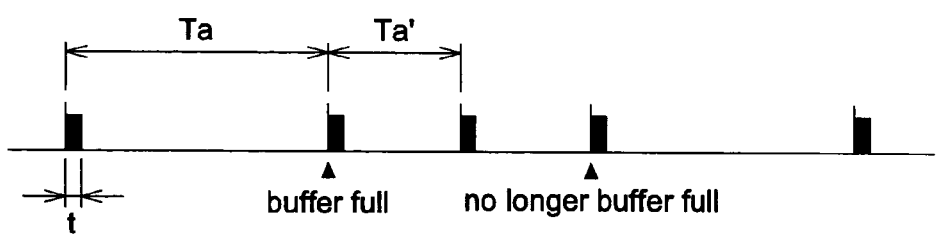
FIGS. 6A and 6B are timing charts illustrating a data process at a buffer full state, at the facsimile apparatus of FIG. 1.
Figure 6B:
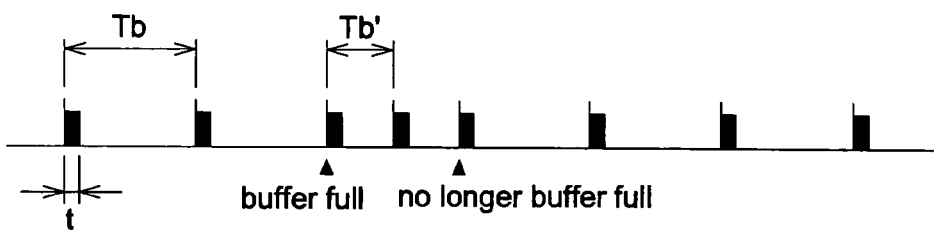

FIG. 6 is a timing chart illustrating the data process at the buffer full state, of a facsimile apparatus of FIG. 1. FIG. 6(A) illustrates the standard communication mode, whereas FIG. 6(B) illustrates the high-speed communication mode. When the data amount stored in jitter buffer 35 is in an ample state, i.e., between the upper and lower limits, the data process is performed at a process rate shown in FIG. 2 (time interval Ta/Tb). However, when the data amount stored in jitter buffer 35 exceeds the upper limit, i.e., at a buffer full state, the operation timing of the output process of jitter buffer 35 and the data process of codec 31 and modem 23 is accelerated. In this example, the data process is performed at a rate twice as fast (time interval Ta'/Tb'). Therefore, it is possible to restore the jitter buffer into the ample state and securely avoid the overflow at the buffer.

Figure 7A:
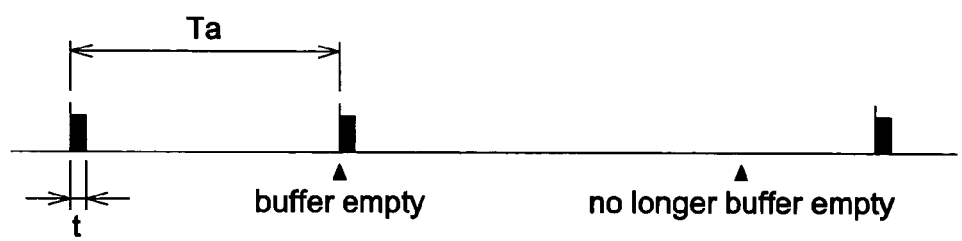
FIGS. 7A and 7B are timing charts illustrating a data process at a buffer empty state, at the facsimile apparatus of FIG. 1.
Figure 7B:
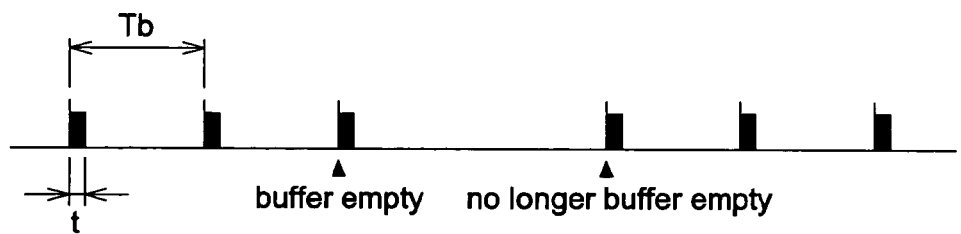

FIG. 7 is a timing chart illustrating the data process at the buffer empty state, of a facsimile apparatus of FIG. 1. FIG. 7(A) illustrates the standard communication mode, whereas FIG. 7(B) illustrates the high-speed communication mode. When the data amount stored in jitter buffer 35 is in a buffer empty state, falling short of the lower limit value, the operation timing of the output process by jitter buffer 35 and the data process by codec 31 and modem 23 is decelerated. In this example, until the buffer empty state is resolved, the output process by jitter buffer 35 and the data process by codec 31 and modem 23 are temporarily halted. Accordingly, it is possible to quickly restore the buffer to the ample state and securely avoid the underflow at jitter buffer 35.

In this embodiment, an example is shown using a data communication apparatus (facsimile apparatus) with a built-in IP telephone adaptor apparatus, the data communication apparatus having transmitter/receiver 11, controller 14, RTP processor 33, jitter buffer processor 34, and codec 31. However, the IP telephone adaptor apparatus having the above components can be separated from the data communication apparatus and digitally connected to the data communication apparatus. Also, the data exchange between codec 31 and modem 23 can be performed by a serial transmission, in place of the digital pulse code modulation (PCM).

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2003-286358 filed on Aug. 5, 2003, entire content of which is expressly incorporated by reference herein.

What is claimed is:

1. A data communication apparatus that exchanges a voice packet via an IP network, the apparatus comprising:
a data processor that executes a standard communication mode and a high-speed communication mode, the voice packet including non-voice data and being exchanged at a predetermined transfer rate via the IP network in the standard communication mode and at a rate faster than the predetermined transfer rate via the IP network in the high-speed communication mode, the standard communication mode and the high-speed communication mode being interchangeably executed;
an acceptor that obtains capability information of a remote apparatus in accordance with a predetermined communication protocol; and
a controller that selects the high-speed communication mode for execution based on a determination, using the capability information, that the remote apparatus is configured to execute the high-speed communication mode.

2. The data communication apparatus according to claim 1, the data processor comprising:
an IP processor that decodes data in the exchanged voice packet; and
a modem that demodulates PCM data that is output from the IP processor.

3. The data communication apparatus according to claim 2,
wherein the controller switches between the standard communication mode and the high-speed communication mode, by adjusting a standard clock that synchronizes mutual operations of the IP processor and the modem.

4. The data communication apparatus according to claim 1, wherein the data processor synchronizes a voice packet transmission operation of the data communication apparatus and a voice packet reception operation of the remote apparatus, upon receiving synchronization information from the remote apparatus, during an execution of the high-speed communication mode.

5. The data communication apparatus according to claim 1, further comprising:
a notification unit that notifies the remote apparatus of capability information regarding the standard communication mode and the high-speed communication mode, when transmitting a connection request to the remote apparatus, in accordance with the predetermined communication protocol.

6. The data communication apparatus according to claim 1, wherein the predetermined communication protocol is Session Initiation Protocol.

7. The data communication apparatus according to claim 1, wherein the non-voice data stored in the voice packet is facsimile data.

8. A data communication method that exchanges a voice packet via an IP network, the method comprising:
obtaining capability information of a remote apparatus in accordance with a predetermined communication protocol, the capability information indicating whether the remote apparatus is configured to execute a high-speed communication mode in which the voice packet, including non-voice data, is exchanged at a predetermined transfer rate via the IP network;
determining, using the capability information, whether the remote apparatus is configured to execute the high-speed communication mode in which the voice packet is exchanged at the predetermined transfer rate;
transferring the voice packet in the high-speed communication mode based on determining that the remote apparatus is configured to execute the high-speed communication mode; and
transferring the voice packet in a standard communication mode based on determining that the remote apparatus is not configured to execute the high-speed communication mode, the voice packet being exchanged in the standard communication mode at a standard transfer rate lower than the predetermined transfer rate.

9. The data communication method according to claim 8, wherein the non-voice data is facsimile data.

10. The data communication method according to claim 9, further comprising:
synchronizing a voice packet transmission operation of the transmitter and a voice packet reception operation of the remote apparatus.

11. A facsimile apparatus that communicates with a terminal via an IP network, the facsimile apparatus comprising:
a transmitter that transmits a voice packet to the terminal via the IP network;
a receiver that receives capability information of the terminal from the terminal via the IP network, the capability information indicating whether the terminal is configured to execute a high-speed communication mode in which the voice packet is exchanged at a first transfer rate;
a VoIP processor that performs a first data conversion between the voice packet and voice data;
a modem that performs a second data conversion between the voice data and facsimile data; and
a controller that determines, using the capability information, whether the terminal is configured to execute the high speed communication mode,
wherein the transmitter transmits the voice packet at the first transfer rate when the controller determines that the terminal is configured to execute the high-speed communication mode, and transmits the voice packet at a second transfer rate, lower than the first transfer rate, when the controller determines that the terminal is not configured to execute the high-speed communication mode.

12. The facsimile apparatus according to claim 11,
wherein the transmitter transmits a request for a media session establishment to the terminal in accordance with a predetermined protocol, and
wherein the capability information is transmitted from the terminal in response to the request.

* * * * *